United States Patent Office 2,977,377
Patented Mar. 28, 1961

2,977,377
PROCESS FOR PREPARING 17 BETA-PYRUVOYL STEROID COMPOUNDS

Eugene J. Agnello, Lyme, and Gerald D. Laubach, Niantic, Conn., assignors to Chas. Pfizer & Co., Inc., New York, N.Y., a corporation of Delaware No Drawing. Filed Apr. 21, 1960, Ser. No. 23,643

6 Claims. (Cl. 260—397.45)

This application is concerned with a new and useful process for the preparation of therapeutically useful steroids. More particularly, it is concerned with a process for the preparation of adrenocortically active steroid compounds characterized by the presence of a 17β-pyruvoyl group. These latter compounds, as will be explained hereinafter, are also useful for the preparation of adrenocortically active steroids characterized by the presence of an α-hydroxy propanoyl group at the 17β-position.

In copending patent application, Serial No. 4,000 filed January 22, 1960, a new class of adrenocortically active steroids is described. These compounds are characterized by the replacement of the usual α-hydroxy acetyl group at the 17β-position with a pyruvoyl group.

Compounds which may be prepared by the process of this invention are represented by the formula:

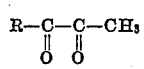

wherein R is a cyclopentanopolyhydrophenanthrene nucleus having adrenocortical activity when substituted at the 17β-position with an α-hydroxy acetyl group and the pyruvoyl group is located at the 17β-position replacing the α-hydroxy acetyl group.

Adrenocortically active steroids now constitute a well-defined class in the art, and include therapeutically active agents having a wide range of applications in the medical field. Cortisone, hydrocortisone, prednisone, prednisolone, 2-methyl-prednisolone, 6-methyl prednisolone, 16α-hydroxy prednisolone, 9α-fluoroprednisolone, 16α-methyl prednisolone, 16β-methyl prednisolone and others have been found to be useful as systemic and topical anti-inflammatory agents and for other medical uses. They have, for example, been used in the treatment of rheumatic diseases and allergies. They are pregnane derivatives having a cyclopentanopolyhydrophenanthrene nucleus. They generally have a double bond at the 4-position, a keto group at the 3-position and an oxygen function at the 11-position. Certain 9,11-dihalo-pregnene derivatives have adrenocortical activity. The process of this invention can be used to prepare adrenocortically active steroids.

Among the 17β-pyruvoyl compounds which can be prepared using the process of this invention are the preferred adrenocortical active steroids described in the aforesaid copending patent application. These include those having the formulas:

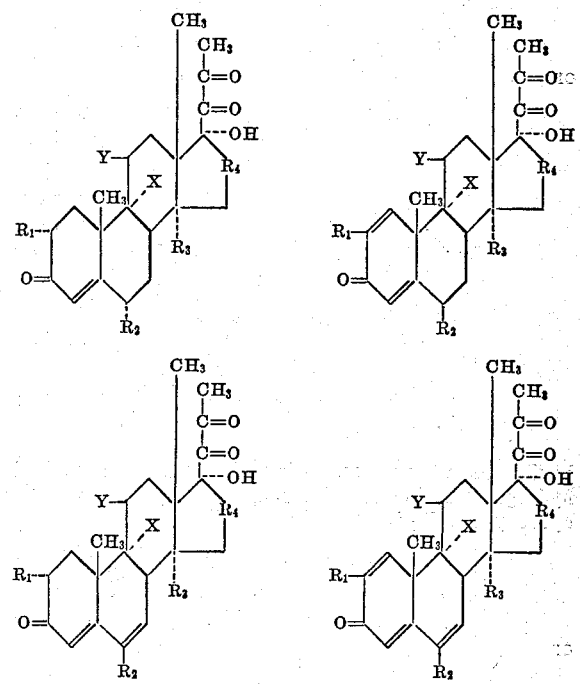

In the above structures, R₁ is hydrogen or methyl; R₂ is hydrogen, fluorine, chlorine or methyl; R₃ is hydrogen or hydroxyl and R₄ is

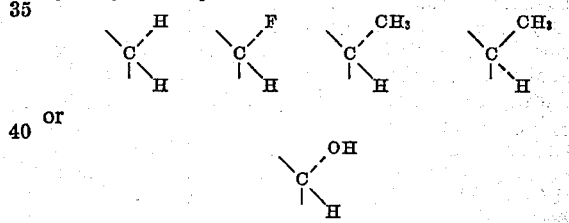

or

In the above structures, X is hydrogen, α-halogen, α-methoxy or α-ethoxy and Y is keto or β-hydroxyl. In the compounds represented above, the carbon atom at the 16-position is always substituted with at least one hydrogen and at least three of R₁, R₂, R₃, and the second substituent on the number sixteen carbon atom is always hydrogen.

Starting compounds which are used in the process of this invention include those having the formula:

$$R-\underset{\underset{O}{\|}}{C}-\underset{\underset{OH}{|}}{CH}-\underset{\underset{Z}{|}}{CH_2}$$

wherein R has the same meaning as above and Z is bromine, chlorine or iodine.

Starting compounds for the preparation of the preferred compounds illustrated above include those having the same steroid nuclei as shown above, but with an α-hydroxy-β-chloro propanoyl group, an α-hydroxy-β-bromo-propanoyl group or an α-hydroxy-β-iodopropanoyl group at the 17β-position. These include those having the formulas:

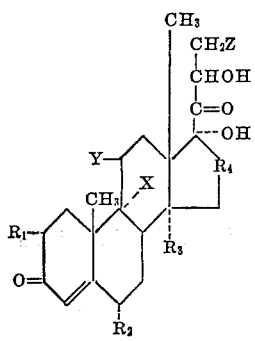 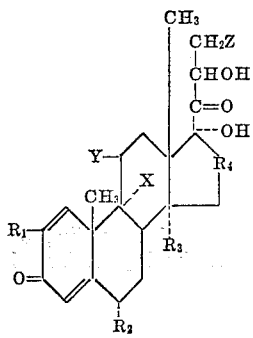

or

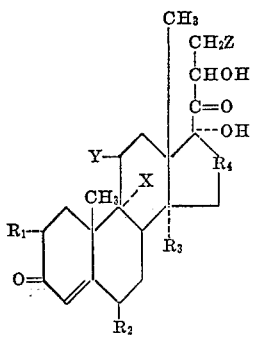

In the above structures, $R_1$ is hydrogen or methyl; $R_2$ is hydrogen, fluorine, chlorine or methyl; $R_3$ is hydrogen or hydroxyl and $R_4$ is

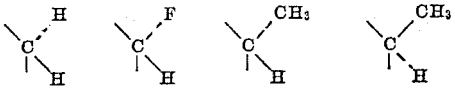

or

In the above structures, X is hydrogen, α-halogen, α-methoxy or α-ethoxy, Y is keto or β-hydroxyl and Z is bromine, chlorine or iodine. In the compounds represented above, the carbon atom at the 16-position is always substituted with at least one hydrogen and at least three of $R_1$, $R_2$, $R_3$, and the second substituent on the number sixteen carbon atom will always be hydrogen.

The 17β-(α-hydroxy-β-halo)-propanoyl compounds, that is, the halohydrins useful as starting materials for the process of this invention are prepared in accordance with the procedure described and claimed in copending patent application, Serial No. 3,998 filed January 22, 1960, which describes their preparation from the corresponding 17β-(2,3-epoxido-propionyl) substituted steroids with a halogen acid in a reaction inert organic solvent at a temperature of from about 15° C. to about 30° C. for a period of from about 15 minutes to about 4 hours. This application also describes the preparation of the 2,3-epoxido-propionyl compounds from the corresponding aldehydes. This latter process is also described in United States Patents Numbered 2,915,533 and 2,915,435, both issued on December 1, 1959. The epoxides are prepared from the corresponding aldehydes by reaction of the aldehyde in either the anhydrous or the monohydrated form with diazomethane in a reaction inert organic solvent at a temperature of from about 0° C. to about 25° C., preferably, from about 0° C. to about 15° C. for a period of from about 1 to about 24 hours. The process is also described and is claimed in copending patent application, Serial No. 3,999 filed January 22, 1960.

The aldehydes in turn are prepared from the corresponding 21-hydroxy compounds by oxidation with cupric acetate using Weijlard's procedure as set forth in U.S. Patent No. 2,773,078. This procedure is described in copending patent application, Serial No. 834,939, filed August 20, 1959, now abandoned, which also claims a number of new and useful 21-aldehydes.

The starting compounds used in the process of this invention, then are prepared by a series of reactions which involves as a first step, conversion of a 21-hydroxy steroid to a 21-aldehyde. The latter compound is converted to an epoxide which in turn is converted to a 17β-pyruvoyl steroid compound.

All of the $\alpha\Delta^4$-21-hydroxy steroids which are useful for the preparation of the preferred starting compounds used in the process of this invention are known, as are many of the other A- and B-ring dehydro analogs. Others can be prepared by known processes as fully described in copending patent application, Serial No. 834,939, filed August 20, 1959, now abandoned.

Compounds having an 11β-hydroxyl group and a halo or alkoxy substituent at the 9α-position are prepared using the procedure of Fried and Sabo as described in the Journal of the American Chemical Society, vol. 79, page 1130. This article describes the preparation of a bromohydrin using N-bromo acetamide and perchloric acid in peroxide-free dioxane. The 9α-bromo-11β-hydroxy compound is converted to a 9β,11β-epoxide using potassium acetate. These epoxides can be converted to the desired 9α-substituted compounds by treatment with a halogen acid or with methanol or ethanol in the presence of 72% perchloric acid.

A double bond at the 6,7-position is introduced by treatment of the above compound with a quinone having an oxidation-reduction potential less than —0.5 at a temperature between 70° C. and 190° C. in an inert organic solvent having a boiling point of at least about 70° C. Suitable solvents include mononuclear aromatic hydrocarbons, mononuclear halogenated aromatic hydrocarbons, oxygenated polar alicyclic organic solvents and oxygenated polar aliphatic organic solvents. Typical solvents include tertiary butanol, n-amyl alcohol, hexanol, isoamyl alcohol, heptanol, 3-cyclohexanol, orthdichloro benzene, xylene, tertiary amyl alcohol, secondary amyl alcohol, benzene, toluene, acetic acid, propionic acid, butyric acid, butyl acetate, amyl acetate, hexyl acetate, butyl propionate, propyl propionate, and amyl propionate. The application of this reaction to the preparation of $\Delta^{4,6}$-androstadiene 9-halo compounds is illustrated in U.S. Patent No. 2,836,607, issued July 27, 1958. Its application to the preparation of the specific compounds of this invention is illustrated in the examples.

A double bond is introduced at the 1,2-position of the preceding compound by contacting it with selenium dioxide in an inert organic solvent at an elevated temperature. Solvents which are useful for this reaction include, for example, tertiary butanol, tertiary pentanol, benzene, ethylene glycol diethers such as dibutyl Cellosolve, dipropyl ether, ethylene glycol and various other glycol ethers, phenetole, xylene, dioxane and naphthalene. Preferred conditions include the addition of a lower aliphatic acid particularly acetic acid to a tert-butanol mixture. In carrying out the reaction, it is generally preferred to utilize temperatures of from about 75° C. to about 200° C. for from about 1 hour to about 100 hours. Generally several molecular proportions of selenium dioxide are added during the reaction period. The application of this reaction is fully illustrated in copending patent application, Serial No. 672,550, filed August 18, 1957.

An 11β-hydroxyl group can be oxidized to an 11-keto group using any of a number of well-known procedures including oxidation with chromium trioxide, sodium dichromate, N-bromoacetamide, the chromic acid-pyridine complex or aluminum isopropoxide or aluminum tert-butoxide in the presence of a hydrogen acceptor such as acetone or cyclohexanone in an inert organic solvent such as benzene, toluene or xylene.

In carrying out the process of this invention, the selected bromohydrin or iodohydrin is taken up in a polar oxygenated aliphatic solvent containing up to 8 carbon atoms and maintained at an elevated temperature until substantial amounts of the desired 17β-pyruvoyl compound are formed. With a chlorohydrin, as is explained below, the process is carried out in the presence of a mineral acid.

Suitable solvents include lower aliphatic esters, alcohols and ketones containing up to eight carbon atoms. Of these, esters especially ethyl acetate are preferred. Ethyl acetate is especially preferred since it is readily available at a reasonable cost and because, under standard atmospheric conditions, it has a suitable boiling point. Solvents which may be mentioned by way of example as suitable for the process of this invention include methanol, ethanol, propanol, butanol, hexanol, octanol, acetone, methyl ethyl ketone, di-propyl ketone, methyl isopropyl ketone, di-n-butyl ketone, propyl formate, propyl acetate, isobutyl propionate and butyl butyrate.

The temperature range for carrying out the reaction is from about 50° C. to about 165° C. and the preferred range is from about 50° C. to about 100° C.

Temperatures below this preferred range may be used, but the duration of the reaction is then unduly extended. Temperatures above this preferred range may also be used but may be expensive to attain and maintain without promoting any significant improvement in yield. With lower boiling solvents, the desired temperature may be attained by increasing the external pressure. This may be effected by carrying out the reaction in a closed vessel and allowing the pressure to increase autogenously by converting some of the solvent to the vapor stage. Alternatively, the pressure may be increased by the application of external pressure. One particularly effective means of accomplishing this is to carry out the reaction in an inert atmosphere, for example, a nitrogen atmosphere, which is maintained at an increased pressure. Neither the increased pressure of the inert atmosphere is essential to the process of this invention, but, as always, the inert atmosphere helps to decrease the possibility of side reactions.

The time of the reaction is not critical since some of the desired products forms almost immediately upon admixture of the starting product in the selected solvent at the desired temperature. However, for optimum yields, it is best to carry out the reaction for a period of from about one to about four hours, preferably two to three hours.

If a bromohydrin or iodohydrin is used as a starting compound, the desired result is obtained simply by maintaining the compound in the solvent within the temperature range for the selected period of time. With a chlorohydrin, reaction is best effected in the presence of hydrogen chloride, preferably as the acid, although it may be simply bubbled into the mixture. The amount of hydrogen chloride which is used is not critical, and any amount from one tenth of a molar equivalent or even less to a one thousand percent molar excess or even more may be employed. It is not even essential that hydrogen chloride be used since all that is required is a source of protons. Mineral acids are preferred, however. Thus, hydrobromic, hydrofluoric, hydriodic or sulfuric acid can be used. The hydrohalides may also be used in the anhydrous form. It is preferred to use hydrogen chloride with a chlorohydrin so as not to introduce foreign atoms into the reaction mixture. There is no objection to the use of these same materials or other proton sources with the other halohydrin starting materials, but it is not necessary and only adds to the cost of the reaction without appreciably increasing the yield.

This invention is a process for the preparation of a compound having the formula:

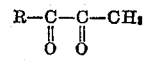

wherein R is a cyclopentanopolyhydrophenanthrene nucleus having adrenocortical activity when substituted at the 17β-position with an α-hydroxy acetyl group and the pyruvoyl group is located at the 17β-position replacing the α-hydroxy acetyl group which comprises maintaining a compound having the formula:

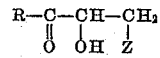

wherein R has the same meaning as above and Z is selected from the group consisting of bromine, chlorine and iodine in a lower polar aliphatic oxygenated solvent containing up to eight carbon atoms for a period of from about one to about four hours at a temperature of from about 50° C. to about 165° C. If the halohydrin is a chlorohydrin, the reaction should be carried out in the presence of a mineral acid. With the other halohydrins, an acid may be used, but it is not essential.

In one aspect of this invention, the halohydrin is generated in situ. This is accomplished by taking up a 17β-(2,3-epoxide)-propionyl steroid compound prepared as described in the aforementioned patents and patent applications in the same solvents as mentioned above and maintaining the mixture within the same temperature range for the selected period of time in the presence of hydrogen chloride, hydrogen bromide, hydrogen iodide either anhydrous or as the hydrohalic acids. It will be seen that this aspect of the invention does not differ essentially from the procedure described above except in the starting compound. Thus, the solvents, temperature, time and reagents employed are the same as described above. Since a different starting material is employed, it may be desirable to carry out the reaction for a longer period of time in order to obtain yields equal to those obtained when a halohydrin is employed as the starting material. However, the best yields obtained using the process of this aspect of the invention are still obtained within a period of from about one to about four hours.

It will be seen that this aspect of the invention may be described as a process wherein the 17β-(α-hydroxy-β-halo)-propanoyl compound is generated in situ and the pyruvoyl compound is prepared by maintaining a compound having the formula:

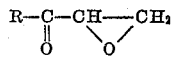

wherein R is a cyclopentanophenanthrene nucleus having adrenocortical activity when substituted at the 17β-position with an α-hydroxy acetyl group and the 2,3-epoxidopropionyl group is located at the 17β-position replacing the α-hydroxy acetyl group in a lower polar aliphatic oxygenated solvent containing up to eight carbon atoms at a temperature of from about 50° C. to about 165° C. for a period of from about one to about four hours in the presence of a reagent selected from the group consisting of hydrogen chloride, hydrogen bromide and hydrogen iodide.

As stated above, the compounds prepared by the process of this invention are therapeutically useful because of their adrenocortical activity. They should be administered alone or in combination with acceptable pharmaceutical carriers, the choice of which is determined by the preferred route of administration, the solubility of the compound and standard pharmaceutical practice. In general, the dosage of these compounds is of approximately the same order of magnitude as the dosage of hydrocortisone, and these compounds are useful to treat the types of pathological conditions often treated with hydrocortisone. Because of their great adrenocortical activity, it is sometimes possible to use dosages of these compounds which are lower than those of hydrocortisone.

For oral administration, the compounds may be administered in the form of tablets containing excipients such as starch or milk sugar. Aqueous suspensions and elixirs which may be sweetened or flavored may also be used. To apply these therapeutic agents topically, they may be prepared in the form of ointments and salves in suitable bases especially non-aqueous petrolatum type bases. For intra-articular injection, aqueous suspensions may be employed. In this case, various suspending and wetting agents may be added to the compositions to obtain a suspension not tending to settle out easily or to pack down in the bottle in which it is stored. Intramuscular and subcutaneous dosage forms may also be prepared by standard pharmaceutical practice.

The compounds prepared by the process of this invention are also useful because they can be converted to adrenocortically active steroids characterized by the presence of an α-hydroxy propanoyl group at the 17β-position. These compounds are described and claimed in copending patent application, Serial No. 3,996, filed January 22, 1960. In that application, a method of converting the 17β-pyruvoyl compounds prepared by the process of this invention to form the B-isomers of therapeutically active α-hydroxy propanoyl substituted steroid compounds is described. The method involves reduction with yeast. Specific yeasts applicable to the reduction include those of the genus Saccharomyces, for example, *Saccharomyces cerevisiae*. The reduction is carried out by subjecting the starting material to the action of a growing culture of the yeast or to a suspension of yeast cells in accordance with standard conditions. The process is further illustrated in the appended examples.

The following examples are given solely for the purpose of illustration and are not to be construed as limitations of this invention, many apparent variations of which are possible without departing from the spirit or scope thereof.

PREPARATION OF STARTING COMPOUND

*Preparation I*

9α-FLUORO-Δ⁴-PREGNENE-11β,17α-DIOL-3,20-DIONE-21-AL

A suspension of 500 mg. of 9α-fluoro-Δ⁴-pregnene-11β,17α,21-triol-3,20-dione synthesized according to Fried's method in 10 ml. of methanol was prepared and maintained at 60° C. while adding 750 mg. of cupric acetate partially dissolved in a mixture of 3 ml. of water and 12 ml. of methanol containing 3 drops of glacial acetic acid. The mixture was maintained at 60° C. for 30 minutes and the blue supernatant liquid decanted from the precipitated cuprous oxide. The blue solution was treated with 100 mg. of ethylenediamine tetraacetic acid and evaporated to a volume of about 4 ml. The moist residue was triturated with 20 ml. of water and filtered. The product was recovered as the monohydrate and converted to the non-hydrated form by heating at 135° C. at 0.5 mm. of mercury pressure for 24 hours.

This identical procedure was used to prepare the following compounds using the appropriate starting compounds. The list is given to avoid unnecessary repetition of experimental details.

(1) $\Delta^4$-pregnene-11β,17α,21-triol-3,20-dione-21-al
(2) 9α-chloro-$\Delta^4$-pregnene-11β,17α-diol-3,20-dione-21-al
(3) 9α-bromo-$\Delta^4$-pregnene-11β,17α-diol-3,20-dione-21-al
(4) 9α-iodo-$\Delta^4$-pregnene-11β,17α-diol-3,20-dione-21-al
(5) 9α-methoxy-$\Delta^4$-pregnene-11β,17α-diol-3,20-dione-21-al
(6) 9α-ethoxy-$\Delta^4$-pregnene-11β,17α-diol-3,20-dione-21-al
(7) 9α-fluoro-$\Delta^4$-pregnene-17α-ol-3,11,20-trione-21-al
(8) 9α-chloro-$\Delta^4$-pregnene-17α-ol-3,11,20-trione-21-al
(9) 9α-bromo-$\Delta^4$-pregnene-17α-ol-3,11,20-trione-21-al
(10) 9α-iodo-$\Delta^4$-pregnene-17α-ol-3,11,20-trione-21-al
(11) 9α-methoxy-$\Delta^4$-pregnene-17α-ol-3,11,20-trione-21-al
(12) 9α-ethoxy-$\Delta^4$-pregnene-17α-ol-3,11,20-trione-21-al
(13) $\Delta^4$-pregnene-17α-ol-3,11,20-trione-21-al The 11-keto compounds used in the preparation of the above aldehydes were prepared, for example, by adding 15 ml. of solution of chromium trioxide in 9:1 acetic acid-water solution containing 76 mg. of chromium trioxide per ml. of solution to 5 grams of the 11-hydroxy starting compound in 25 ml. of glacial acetic acid. The mixture was kept at room temperature during the addition and for an additional four hours. The product was precipitated by the addition of water and converted to the free alcohol by adding one molar portion of potassium carbonate in 10% water-methanol solution to a methanol solution of the ester. It was stirred at room temperature and poured into ice water to precipitate the free alcohol.

*Preparation II*

17β-(2,3-EPOXIDO-PROPIONYL)-Δ⁴-ANDROSTENE-11β,17α-DIOL-3-ONE

A solution was prepared containing 1 mmole of $\Delta^4$-pregnene-11β,17α-diol-3,20-dione-21-al monohydrate in 35 ml. of methanol containing 17.5 ml. of ether. To this solution there was added a diazomethane solution containing 4 mmoles of diazomethane in 17.5 ml. of ether. The solution was maintained at 0° C. for 24 hours and the solution evaporated in vacuo. The residue was triturated with ether and the crystalline product recovered by filtration. A sample was recrystallized from ethyl acetate and dried in vacuo at 60° C. for 16 hours; M.P. 218–220° C. (d.), $[\alpha]_D = +179°$ (dioxane), $$\lambda_{max}^{alc.}\ 242\ m\mu\ (16{,}000)$$

*Analysis.*—Calcd. for $C_{22}H_{30}O_5$: C, 70.56; H, 8.08. Found: C, 71.32; H, 7.95.

*Preparation III*

17β-(2,3-EPOXIDO-PROPIONYL)-Δ¹,⁴-ANDROSTADIENE-11β,17α-DIOL-3-ONE

A solution containing 1 mmole of $\Delta^{1,4}$-pregnadiene-11β,17α-diol-3,20-dione-21-al monohydrate in 35 ml. of methanol and 17.5 ml. of ether was prepared. To this solution there was added 7 mmoles of diazomethane in 17.5 ml. of ether at 0° C. After 15 minutes the mixture was removed from the low temperature medium and allowed to remain at room temperature for 2 hours. The excess diazomethane was destroyed by addition of 1 ml. of 6 N acetic acid. The solution was concentrated in vacuo to a total volume of about 5 ml. and taken up in 50 ml. of chloroform. The chloroform extract was washed 3 times with 5 ml. portions of 5% sodium bicarbonate and then 4 times with 5 ml. portions of water. The organic layer was dried over anhydrous sodium sulfate and concentrated to dryness. The residue was triturated with ether and the crystalline product recovered by filtration. A sample was recrystallized from ethyl acetate and dried in vacuo at 100° C. for 16 hours; M.P. 260.5–262.5° C., $$\lambda_{max}^{alc.}\ 243\ m\mu\ (15{,}300)$$

$[\alpha]_D = +146$ (dioxane).

*Analysis.*—Calcd. for $C_{22}H_{28}O_5$: C, 70.94; H, 7.58. Found: C, 70.91; H, 7.56.

*Preparation IV*

17β-(2,3-EPOXIDO-PROPIONYL)-Δ¹,⁴,⁶-ANDROSTATRIENE-11β,17α-DIOL-3-ONE

A solution containing 1 mmole of $\Delta^{1,4,6}$-pregnatriene-11β,17α-diol,3,20-dione-21-al in 50 ml. of ethanol was prepared. To this solution there was added an ether solution containing 1 mmole of diazomethane and the solution was allowed to stand at 25° C. for 24 hours. The desired product was recovered by evaporation of the solvent in vacuo, trituration of the residue with ether and filtration.

The following compounds were prepared using the procedure of Preparations II through IV:

(1) 9α - fluoro - 17β - (2,3 - epoxido - propionyl) - Δ⁴ - androstene-11β,17α-diol-3-one
(2) 9α - fluoro - 17β - (2,3 - epoxido - propionyl) - Δ¹,⁴ - androstadiene-11β,17α-diol-3-one
(3) 9α - fluoro - 17β - (2,3 - epoxido - propionyl) - Δ¹,⁴,⁶-androstatriene-11β,17α-diol-3-one
(4) 9α - bromo - 17β - (2,3 -epoxido - propionyl) - Δ⁴ - androstene-11β,17α-diol-3-one
(5) 16α - methyl - 17β - (2,3 - epoxido - propionyl) -Δ⁴ - androstene-11β,17α-diol-3-one
(6) 16β - methyl - 17β - (2,3 - epoxido - propionyl) - Δ⁴-androstene-11β,17α-diol-3-one
(7) 6α - fluoro - 17β - (2,3 - epoxido - propionyl) - Δ⁴ - androstene-11β,17α-diol-3-one
(8) 6α - chloro - 17β - (2,3 - epoxido - propionyl) - Δ⁴ - androstene-11β,17α-diol-3-one
(9) 6α - fluoro - 17β - (2,3 - epoxido - propionyl) - Δ¹,⁴-androstadiene-11β,17α-diol-3-one
(10) 6α,9α - difluoro - 17β - (2,3 - epoxido - propionyl) - Δ¹,⁴-androstadiene-11β,17α-diol-3-one

Preparation V

21-CHLOROMETHYL-Δ¹,⁴-PREGNADIENE-11β,17α,21-TRIOL-3,20-DIONE

A solution containing 500 mg. of 17β-(2,3-epoxido-propionyl) - Δ¹,⁴ - androstadiene-11β,17α-diol-3-one in 50 ml. of alcohol-free chloroform was prepared and a solution containing a 500% molar excess of anhydrous hydrogen chloride in 50 ml. of glacial acetic acid was added. The solution was maintained at 25° C. for one and one-half hours and 125 ml. of chloroform was added together with 75 ml. of water. The excess acid was neutralized by the addition of solid potassium carbonate and the organic layer separated. It was washed with water, dried over anhydrous sodium sulfate, filtered and the filtrate concentrated to dryness in vacuo. The residue was triturated with 2:1 ether-ethyl acetate, filtered and the precipitate recrystallized from ethyl acetate-chloroform to give the desired product melting at 199–200° C. (d.), $[\alpha]_D = +66°$ (dioxane), $$\lambda_{max}^{alc.} = 243\ m\mu\ (14,350)$$

*Analysis.*—Calcd for $C_{22}H_{29}O_5Cl$: C, 64.6; H, 7.15; Cl, 8.7. Found: C, 64.8; H, 7.2; Cl, 8.1.

Preparation VI

21-IODOMETHYL-Δ⁴-PREGNENE-11β,17α,21-TRIOL-3,20-DIONE

A solution containing 500 mg. of 17β-(2,3-epoxido-propionyl)-Δ⁴-androstene-11β,17α-diol-3-one in 50 ml. of dioxane was prepared and a solution containing an equimolar portion of hydrogen iodide in 50 ml. of dioxane was added. The solution was maintained at −30° C. for 3 hours. It was evaporated to dryness and the residue triturated with 2:1 ether-ethyl acetate. The product was recovered by filtration and recrystallized from ethyl acetate-chloroform.

Preparation VII

21-BROMOMETHYL-Δ⁴-PREGNENE-11β,17α,21-TRIOL-3,20-DIONE

A solution containing 500 mg. of 17β-(2,3-epoxido-propionyl)-Δ⁴-androstene-11β,17α-diol-3-one in 50 ml. of ethylene chloride was prepared and an ethylene chloride solution containing a 1000% molar excess of anhydrous hydrogen bromide was added. The solution was maintained at 25° C. for 2½ hours. The product was recovered by filtration and recrystallized from ethyl acetate-chloroform.

The following compounds were similarly prepared:

(1) 21 - chloromethyl - Δ⁴ - pregnene - 11β,17α,21 - triol-3,20-dione
(2) 21 - chloromethyl - Δ¹,⁴,⁶ - pregnatriene - 11β,17α,21-triol-3,20-dione
(3) 9α - fluoro - 21 - chloromethyl - Δ⁴ - pregnene - 11β,17α,21-triol-3,20-dione
(4) 9α - fluoro - 21- chloromethyl - Δ¹,⁴ - pregnadiene - 11β,17α,21-triol-3,20-dione
(5) 9α - fluoro - 21 - chloromethyl - Δ¹,⁴,⁶ - pregnatriene - 11β,17α,21-triol-3,20-dione
(6) 9α - bromo - 21 - chloromethyl - Δ⁴ - pregnene - 11β, 17α,21-triol-3,20-dione
(7) 16α - methyl - 21 - chloromethyl - Δ⁴ - pregnene - 11β,17α,21-triol-3,20-dione
(8) 16β - methyl - 21 - chloromethyl - Δ⁴ - pregnene - 11β,17α,21-triol-3,20-dione
(9) 6α - fluoro - 21 - chloromethyl - Δ⁴ - pregnene - 11β, 17α,21-triol-3,20-dione
(10) 6α - fluoro - 21 - bromomethyl - Δ¹,⁴ - pregnadiene-11β,17α,21-triol-3,20-dione
(11) 6α,9α - difluoro - 21 - bromomethyl - Δ¹,⁴ - pregnadiene-11β,17α,21-triol-3,20-dione
(12) 16α - fluoro - 21 - chloromethyl - Δ⁴ - pregnene - 11β,17α,21-triol-3,20-dione

Example I

21-METHYL-Δ⁴-PREGNENE-11β,17α-DIOL-3,20,21-TRIONE

A total of 5 grams of 21-bromomethyl-Δ⁴-pregnene-11β,17α,21-triol-3,20-dione was taken up in 100 ml. of ethyl acetate and refluxed for three hours at atmospheric temperature. At the end of this period, the solution was evaporated in vacuo to remove the solvent and the residue triturated with ether to give the desired product.

Example II

9α-FLUORO-21-METHY-Δ¹,⁴-PREGNADIENE-11β,17α-DIOL-3,20,21-TRIONE

A total of 5 grams of 9α-fluoro-21-iodomethyl-Δ¹,⁴-pregnadiene-11β,17α,21-triol-3,20-dione was taken up in 100 ml. of ethyl acetate and maintained at a temperature of 165° C. for one hour under an atmosphere of nitrogen maintained at a pressure of ten atmospheres. At the end of this period, the solution was evaporated to leave the desired product as a residue. It was purified by recrystallization from ethyl acetate and melted at 216 to 220° C. (d).

Example III

21-METHYL-Δ¹,⁴-PREGNADIENE-11β,17α-DIOL-3,20,21-TRIONE

A mixture containing 10 grams of 21-chloromethyl-Δ¹,⁴-pregnadiene-11β,17α,21-triol-3,20-dione in 150 ml. of methyl isopropylketone was maintained at 50° C. for four hours while bubbling in anhydrous hydrogen chloride. At the end of this period, the solvent was removed in vacuo to leave the desired product as a residue. It was recrystallized from ethyl acetate and melted at 211 to 212° C.

Example IV

6α,9α-DIFLUORO-21-METHYL-Δ¹,⁴-PREGNADIENE-11β,17α-DIOL-3,20,21-TRIONE

A mixture containing 5 grams of 6α,9α-difluoro-21-bromomethyl - Δ¹,⁴ - pregnadiene - 11β,17α,21 - triol - 3,20-dione in 200 ml. of ethanol was refluxed at atmospheric pressure for three hours. At the end of this period, the solvent was evaporated in vacuo to leave the desired product as a residue. It was crystallized by trituration with ether.

Example V

21-METHYL-Δ¹,⁴,⁶-PREGNATRIENE-11β,17α-DIOL-3,20,21-TRIONE

A mixture containing 5 grams of 21-chloromethyl- $\Delta^{1,4,6}$-pregnatriene-11β,17α,21-triol-3,20-dione and 3 ml. of concentrated hydrochloric acid in 150 ml. of ethyl acetate was refluxed for four hours. At the end of this period, the mixture was evaporated in vacuo to a volume of 30 ml. The mixture was washed once with an equal volume of water, a second time with an equal volume of 5% aqueous sodium carbonate and again with water. The organic layer was separated and the solvent removed in vacuo to leave the desired product as a residue. It was recrystallized from ethyl acetate.

*Example VI*

16α-FLUORO-21-METHYL-$\Delta^{1,4}$-PREGNADIENE-11β,17α-DIOL-3,20,21-TRIONE

A total of 10 grams of 16α-fluoro-21-bromomethyl-$\Delta^{1,4}$-pregnadiene-11β,17α,21-triol-3,20-dione was taken up in 100 ml. of butanol and refluxed at atmospheric pressure for two hours. At the end of this period, the solvent was removed in vacuo to leave the desired product as a residue.

*Example VII*

9α-FLUORO-16α,21-DIMETHYL-$\Delta^{4,6}$-PREGNADIENE-11β,17α-DIOL-3,20,21-TRIONE A total of 5 grams of 9α-fluoro-16-methyl-21-iodomethyl-$\Delta^{4,6}$-pregnadiene-11β,17α,21-triol-3,20-dione in 100 ml. of octanol was maintained at 50° C. under a nitrogen atmosphere for four hours. At the end of this period, the solvent was removed in vacuo to leave the desired product as a residue. It was purified by recrystallization from ethyl acetate.

*Example VIII*

21-METHYL-$\Delta^4$-PREGNENE-11β,17α-DIOL-3,20,21-TRIONE

A solution was prepared containing 5 grams of 17β-(2,3-epoxido-propionyl)-$\Delta^4$-androstene - 11β,17α - diol-3-one in 100 ml. of ethyl acetate. Anhydrous hydrogen bromide was bubbled into the mixture for four hours while maintaining the temperature at 100° C. At the end of this period, the solvent was removed in vacuo to leave the desired product as a residue.

*Example XI*

9α-FLUORO-21-METHYL-$\Delta^{1,4}$-PREGNADIENE-11β,17α-DIOL-3,20,21-TRIONE

A mixture containing 10 grams of 9α-fluoro-17β-(2,3-epoxido-propionyl)-$\Delta^{1,4}$-androstadiene - 11β,17α - diol-3-one in 100 ml. of octanol was maintained at 165° C. for one hour while anhydrous hydrogen chloride was bubbled into the mixture. At the end of this period, the solvent was evaporated in vacuo to leave the desired product as a residue. It was crystallized by trituration with ether.

*Example X*

21-METHYL-$\Delta^{1,4,6}$-PREGNATRIENE-11β,17α-DIOL-3,20,21-TRIONE

A mixture containing 10 grams of 17β-(2,3-epoxido-propionyl)-$\Delta^{1,4,6}$-androstatriene-11β,17α-diol-3-one in 200 ml. of propanol was refluxed for two hours while anhydrous hydrogen iodide was bubbled into the mixture. At the end of this period, the solvent was removed in vacuo and the desired product crystallized by triturating the residue with 1:1 ethyl acetate-ether.

*Example XI*

9α-FLUORO-21-METHYL-$\Delta^4$-PREGNENE-11β,17α-DIOL-3,20,21-TRIONE

A mixture containing 5 grams of 21-bromomethyl-$\Delta^4$-pregnene-11β,17α,21-triol-3,20-dione and 3 ml. of concentrated hydrofluoric acid in 150 m. of ethyl acetate was refluxed for four hours. At the end of this period, the mixture was evaporated in vacuo to a volume of 30 ml. It was washed once with an equal volume of water, the second time with an equal volume of 5% aqueous potassium bicarbonate and again with water. The organic layer was separated and the solvent removed in vacuo to leave the desired product as a residue. It was recrystallized from ethyl acetate.

The following list of compounds are prepared in accordance with the procedures of the foregoing examples. The list is given to avoid unnecessary repetition of experimental details.

9α-fluoro-21-methyl-$\Delta^4$-pregnene - 11β,17α-diol - 3,20,21-trione

9α-chloro-21-methyl-$\Delta^4$-pregnene - 11β,17α - diol-3,20,21-trione

9α-bromo-21-methyl-$\Delta^4$-pregnene - 11β,17α - diol-3,20,21-trione

9α-iodo-21-methyl-$\Delta^4$-pregnene - 11β,17α - diol-3,20,21-trione

9α-methoxy-21-methyl-$\Delta^4$-pregnene - 11β,17α - diol-3,20,21-trione

9α-ethoxy-21-methyl-$\Delta^4$-pregnene - 11β,17α - diol-3,20,21-trione 21-methyl-$\Delta^4$-pregnene-17α-ol-3,11,20,21-tetrone 9α-fluoro-21-methyl-$\Delta^4$-pregnene - 17α - ol - 3,11,20,21-tetrone 9α-chloro-21-methyl-$\Delta^4$-pregnene - 17α - ol - 3,11,20,21-tetrone 9α-bromo-21-methyl-$\Delta^4$-pregnene - 17α - ol - 3,11,20,21-tetrone 9α-iodo-21-methyl-$\Delta^4$-pregnene - 17α - ol - 3,11,20,21-tetrone 9α-methoxy-21-methyl-$\Delta^4$-pregnene - 17α - ol - 3,11,20,21-tetrone 9α-ethoxy-21-methyl-$\Delta^4$-pregnene - 17α - ol - 3,11,20,21-tetrone 2α,21-dimethyl-$\Delta^4$-pregnene - 11β,17α - diol - 3,20,21-trione 2α,21-dimethyl-9α-fluoro - $\Delta^4$ - pregnene-11β,17α-diol-3,20,21-trione 2α,21-dimethyl-9α-chloro - $\Delta^4$ - pregnene-11β,17α-diol-3,20,21-trione 2α,21-dimethyl-9α-bromo - $\Delta^4$ - pregnene-11β,17α-diol-3,20,21-trione 2α,21-dimethyl-9α-iodo - $\Delta^4$ - pregnene-11β,17α-diol-3,20,21-trione 2α,21-dimethyl-9α-methoxy - $\Delta^4$ - pregnene-11β,17α-diol-3,20,21-trione 2α,21-dimethyl-9α-ethoxy - $\Delta^4$ - pregnene-11β,17α-diol-3,20,21-trione 2α,21-dimethyl-$\Delta^4$-pregnene-17α-ol-3,11,20,21-tetrone 2α,21-dimethyl-9α-fluoro - $\Delta^4$ - pregnene-17α-ol-3,11,20,21-tetrone 2α,21-dimethyl-9α-chloro - $\Delta^4$ - pregnene-17α-ol-3,11,20,21-tetrone 2α,21-dimethyl-9α-bromo - $\Delta^4$ - pregnene-17α-ol-3,11,20,21-tetrone 2α,21-dimethyl-9α-iodo - $\Delta^4$ - pregnene-17α-ol-3,11,20,21-tetrone 2α,21-dimethyl-9α-methoxy - $\Delta^4$ - pregnene-17α-ol-3,11,20,21-tetrone 2α,21-dimethyl-9α-ethoxy - $\Delta^4$ - pregnene-17α-ol-3,11,20,21-tetrone 6α,21-dimethyl-$\Delta^4$-pregnene-11β,17α-diol-3,20,21-trione 6α,21-dimethyl-9α-fluoro - $\Delta^4$ - pregnene-11β,17α-diol-3,20,21-trione 6α,21-dimethyl-9α-chloro - $\Delta^4$ - pregnene-11β,17α-diol-3,20,21-trione 6α,21-dimethyl-9α-bromo - $\Delta^4$ - pregnene-11β,17α-diol-3,20,21-trione 6α,21-dimethyl-9α-iodo - $\Delta^4$ - pregnene-11β,17α-diol-3,20,21-trione 6α,21-dimethyl-9α-methoxy - $\Delta^4$ - pregnene-11β,17α-diol-3,20,21-trione 6α,21-dimethyl-9α-ethoxy - $\Delta^4$ - pregnene-11β,17α-diol-3,20,21-trione 6α,21-dimethyl-$\Delta^4$-pregnene-17α-ol-3,11,20,21-tetrone 6α,21-dimethyl-9α-fluoro-$\Delta^4$-pregnene-17α - ol-3,11,20,21-tetrone 6α,21-dimethyl-9α-chloro-Δ⁴-pregnene-17α-ol-3,11,20,21-tetrone
6α,21-dimethyl-9α-bromo-Δ⁴-pregnene-17α-ol-3,11,20,21-tetrone
6α,21-dimethyl-9α-iodo-Δ⁴-pregnene-17α-ol-3,11,20,21-tetrone
6α,21-dimethyl-9α-methoxy-Δ⁴-pregnene-17α-ol-3,11,20,21-tetrone
6α,21-dimethyl-9α-ethoxy-Δ⁴-pregnene-17α-ol-3,11,20,21-tetrone 21-methyl-Δ⁴-pregnene-14α,17α-diol-3,11,20,21-tetrone
9α-fluoro-21-methyl-Δ⁴-pregnene-14α,17α-diol-3,11,20,21-tetrone
9α-chloro-21-methyl-Δ⁴-pregnene-14α,17α-diol-3,11,20,21-tetrone
9α-bromo-21-methyl-Δ⁴-pregnene-14α,17α-diol-3,11,20,21-tetrone
9α-iodo-21-methyl-Δ⁴-pregnene-14α,17α-diol-3,11,20,21-tetrone
9α-methoxy-21-methyl-Δ⁴-pregnene-14α,17α-diol-3,11,20,21-tetrone
9α-ethoxy-21-methyl-Δ⁴-pregnene-14α,17α-diol-3,11,20,21-tetrone 21-methyl-Δ⁴-pregnene-11β,16α,17α-triol-3,20,21-trione
9α-fluoro-21-methyl-Δ⁴-pregnene-11β,16α,17α-triol-3,20,21-trione
9α-chloro-21-methyl-Δ⁴-pregnene-11β,16α,17α-triol-3,20,21-trione
9α-bromo-21-methyl-Δ⁴-pregnene-11β,16α,17α-triol-3,20,21-trione
9α-iodo-21-methyl-Δ⁴-pregnene-11β,16α,17α-triol-3,20,21-trione
9α-methoxy-21-methyl-Δ⁴-pregnene-11β,16α,17α-triol-3,20,21-trione
9α-ethoxy-21-methyl-Δ⁴-pregnene-11β,16α,17α-triol-3,20,21-trione 21-methyl-Δ⁴-pregnene-16α,17α-diol-3,11,20,21-tetrone
9α-fluoro-21-methyl-Δ⁴-pregnene-16α,17α-diol-3,11,20,21-tetrone
9α-chloro-21-methyl-Δ⁴-pregnene-16α,17α-diol-3,11,20,21-tetrone
9α-bromo-21-methyl-Δ⁴-pregnene-16α,17α-diol-3,11,20,21-tetrone
9α-iodo-21-methyl-Δ⁴-pregnene-16α,17α-diol-3,11,20,21-tetrone
9α-methoxy-21-methyl-Δ⁴-pregnene-16α,17α-diol-3,11,20,21-tetrone
9α-ethoxy-21-methyl-Δ⁴-pregnene-16α,17α-diol-3,11,20,21-tetrone 6α-fluoro-21-methyl-Δ⁴-pregnene-11β,17α-diol-3,20,21-trione
6α,9α-difluoro-21-methyl-Δ⁴-pregnene-11β,17α-diol-3,20,21-trione
6α-fluoro-9α-chloro-21-methyl-Δ⁴-pregnene-11β,17α-diol-3,20,21-trione
6α-fluoro-9α-bromo-21-methyl-Δ⁴-pregnene-11β,17α-diol-3,20,21-trione
6α-fluoro-9α-iodo-21-methyl-Δ⁴-pregnene-11β,17α-diol-3,20,21-trione
6α-fluoro-9α-methoxy-21-methyl-Δ⁴-pregnene-11β,17α-diol-3,20,21-trione
6α-fluoro-9α-ethoxy-21-methyl-Δ⁴-pregnene-11β,17α-diol-3,20,21-trione 6α-fluoro-21-methyl-Δ⁴-pregnene-17α-ol-3,11,20,21-tetrone
6α,9α-difluoro-21-methyl-Δ⁴-pregnene-17α-ol-3,11,20,21-tetrone
6α-fluoro-9α-chloro-21-methyl-Δ⁴-pregnene-17α-ol-3,11,20,21-tetrone
6α-fluoro-9α-bromo-21-methyl-Δ⁴-pregnene-17α-ol-3,11,20,21-tetrone
6α-fluoro-9α-iodo-21-methyl-Δ⁴-pregnene-17α-ol-3,11,20,21-tetrone
6α-fluoro-9α-methoxy-21-methyl-Δ⁴-pregnene-17α-ol-3,11,20,21-tetrone
6α-fluoro-9α-ethoxy-21-methyl-Δ⁴-pregnene-17α-ol-3,11,20,21-tetrone 16α,21-dimethyl-Δ⁴-pregnene-11β,17α-diol-3,20,21-trione
16α,21-dimethyl-9α-fluoro-Δ⁴-pregnene-11β,17α-diol-3,20,21-trione
16α,21-dimethyl-9α-chloro-Δ⁴-pregnene-11β,17α-diol-3,20,21-trione
16α,21-dimethyl-9α-bromo-Δ⁴-pregnene-11β,17α-diol-3,20,21-trione
16α,21-dimethyl-9α-iodo-Δ⁴-pregnene-11β,17α-diol-3,20,21-trione
16α,21-dimethyl-9α-methoxy-Δ⁴-pregnene-11β,17α-diol-3,20,21-trione
16α,21-dimethyl-9α-ethoxy-Δ⁴-pregnene-11β,17α-diol-3,20,21-trione 16α,21-dimethyl-Δ⁴-pregnene-17α-ol-3,11,20,21-tetrone
16α,21-dimethyl-9α-fluoro-Δ⁴-pregnene-17α-ol-3,11,20,21-tetrone
16α,21-dimethyl-9α-chloro-Δ⁴-pregnene-17α-ol-3,11,20,21-tetrone
16α,21-dimethyl-9α-bromo-Δ⁴-pregnene-17α-ol-3,11,20,21-tetrone
16α,21-dimethyl-9α-iodo-Δ⁴-pregnene-17α-ol-3,11,20,21-tetrone
16α,21-dimethyl-9α-methoxy-Δ⁴-pregnene-17α-ol-3,11,20,21-tetrone
16α,21-dimethyl-9α-ethoxy-Δ⁴-pregnene-17α-ol-3,11,20,21-tetrone 9α-fluoro-21-methyl-Δ¹,⁴-pregnadiene-11β,17α-diol-3,20,21-trione
9α-chloro-21-methyl-Δ¹,⁴-pregnadiene-11β,17α-diol-3,20,21-trione
9α-bromo-21-methyl-Δ¹,⁴-pregnadiene-11β,17α-diol-3,20,21-trione
9α-iodo-21-methyl-Δ¹,⁴-pregnadiene-11β,17α-diol-3,20,21-trione
9α-methoxy-21-methyl-Δ¹,⁴-pregnadiene-11β,17α-diol-3,20,21-trione
9α-ethoxy-21-methyl-Δ¹,⁴-pregnadiene-11β,17α-diol-3,20,21-trione 21-methyl-Δ¹,⁴-pregnadiene-17α-ol-3,11,20,21-tetrone
9α-fluoro-21-methyl-Δ¹,⁴-pregnadiene-17α-ol-3,11,20,21-tetrone
9α-chloro-21-methyl-Δ¹,⁴-pregnadiene-17α-ol-3,11,20,21-tetrone
9α-bromo-21-methyl-Δ¹,⁴-pregnadiene-17α-ol-3,11,20,21-tetrone
9α-iodo-21-methyl-Δ¹,⁴-pregnadiene-17α-ol-3,11,20,21-tetrone
9α-methoxy-21-methyl-Δ¹,⁴-pregnadiene-17α-ol-3,11,20,21-tetrone
9α-ethoxy-21-methyl-Δ¹,⁴-pregnadiene-17α-ol-3,11,20,21-tetrone 2,21-dimethyl-Δ¹,⁴-pregnadiene-11β,17α-diol-3,20,21-trione
2,21-dimethyl-9α-fluoro-Δ¹,⁴-pregnadiene-11β,17α-diol-3,20,21-trione
2,21-dimethyl-9α-chloro-Δ¹,⁴-pregnadiene-11β,17α-diol-3,20,21-trione
2,21-dimethyl-9α-bromo-Δ¹,⁴-pregnadiene-11β,17α-diol-3,20,21-trione
2,21-dimethyl-9α-iodo-Δ¹,⁴-pregnadiene-11β,17α-diol-3,20,21-trione
2,21-dimethyl-9α-methoxy-Δ¹,⁴-pregnadiene-11β,17α-diol-3,20,21-trione
2,21-dimethyl-9α-ethoxy-Δ¹,⁴-pregnadiene-11β,17α-diol-3,20,21-trione 2,21-dimethyl-Δ¹,⁴-pregnadiene-17α-ol-3,11,20,21-tetrone
2,21-dimethyl-9α-fluoro-Δ¹,⁴-pregnadiene-17α-ol-3,11,20,21-tetrone 2,21-dimethyl-9α-chloro - Δ$^{1,4}$ - pregnadiene-17α-ol-3,11,20,21-tetrone 2,21-dimethyl-9α-bromo-Δ$^{1,4}$-pregnadiene - 17α-ol-3,11,20,21-tetrone 2,21-dimethyl - 9α - iodo-Δ$^{1,4}$-pregnadiene-17α-ol-3,11,20,21-tetrone 2,21-dimethyl - 9α - methoxy-Δ$^{1,4}$-pregnadiene-17α-ol-3,11,20,21-tetrone 2,21-dimethyl-9α-ethoxy-Δ$^{1,4}$-pregnadiene-17α - ol-3,11,20,21-tetrone 6α,21-dimethyl-Δ$^{1,4}$-pregnadiene - 11β,17α - diol-3,20,21-trione 6α,21-dimethyl-9α-fluoro - Δ$^{1,4}$ - pregnadiene-11β,17α-diol-3,20,21-trione 6α,21-dimethyl - 9α-chloro-Δ$^{1,4}$-pregnadiene-11β,17α-diol-3,20,21-trione 6α,21-dimethyl - 9α - bromo-Δ$^{1,4}$-pregnadiene-11β,17α-diol-3,20,21-trione 6α,21-dimethyl-9α-iodo-Δ$^{1,4}$-pregnadiene - 11β,17α-diol-3,20,21-trione 6α,21-dimethyl-9α-methoxy - Δ$^{1,4}$ - pregnadiene-11β,17α-diol-3,20,21-trione 6α,21-dimethyl - 9α-ethoxy-Δ$^{1,4}$-pregnadiene-11β,17α-diol-3,20,21-trione 6α,21-dimethyl-Δ$^{1,4}$-pregnadiene-17α-ol-3,11,20,21-tetrone 6α,21 - dimethyl - 9α-fluoro-Δ$^{1,4}$-pregnadiene-17α-ol-3,11,20,21-tetrone 6α,21 - dimethyl - 9α-chloro-Δ$^{1,4}$-pregnadiene-17α-ol-3,11,20,21-tetrone 6α,21 - dimethyl - 9α-bromo-Δ$^{1,4}$-pregnadiene-17α-ol-3,11,20,21-tetrone 6α,21 - dimethyl-9α-iodo-Δ$^{1,4}$-pregnadiene-17α-ol-3,11,20,21-tetrone 6α,21 - dimethyl - 9α - methoxy-Δ$^{1,4}$-pregnadiene-17α-ol-3,11,20,21-tetrone 6α,21 - dimethyl - 9α-ethoxy-Δ$^{1,4}$-pregnadiene-17α-ol-3,11,20,21-tetrone 21-methyl - Δ$^{1,4}$ - pregnadiene - 11β,14α,17α-triol-3,20,21-trione 9α-fluoro - 21-methyl-Δ$^{1,4}$-pregnadiene-11β,14α,17α-triol-3,20,21-trione 9α-chloro - 21-methyl-Δ$^{1,4}$-pregnadiene-11β,14α,17α-triol-3,20,21-trione 9α-bromo - 21-methyl-Δ$^{1,4}$-pregnadiene-11β,14α,17α-triol-3,20,21-trione 9α-iodo - 21 - methyl - Δ$^{1,4}$-pregnadiene-11β,14α,17α-triol-3,20,21-trione 9α-methoxy - 21 - methyl - Δ$^{1,4}$-pregnadiene-11β,14α,17α-triol-3,20,21-trione 9α-ethoxy - 21-methyl-Δ$^{1,4}$-pregnadiene-11β,14α,17α-triol-3,20,21-trione 21-methyl - Δ$^{1,4}$ - pregnadiene - 14α,17α - diol-3,11,20,21-tetrone 9α-fluoro - 21-methyl-Δ$^{1,4}$-pregnadiene-14α,17α-diol-3,11,20,21-tetrone 9α-chloro - 21-methyl-Δ$^{1,4}$-pregnadiene-14α,17α-diol-3,11,20,21-tetrone 9α-bromo - 21-methyl-Δ$^{1,4}$-pregnadiene-14α,17α-diol-3,11,20,21-tetrone 9α-iodo - 21 - methyl-Δ$^{1,4}$-pregnadiene-14α,17α-diol-3,11,20,21-tetrone 9α-methoxy - 21 - methyl-Δ$^{1,4}$-pregnadiene-14α,17α-diol-3,11,20,21-tetrone 9α-ethoxy - 21-methyl-Δ$^{1,4}$-pregnadiene-14α,17α-diol-3,11,20,21-tetrone 21-methyl - Δ$^{1,4}$ - pregnadiene - 11β,16α,17α-triol-3,20,21-trione 9α-fluoro - 21-methyl-Δ$^{1,4}$-pregnadiene-11β,16α,17α-triol-3,20,21-trione 9α-chloro - 21-methyl-Δ$^{1,4}$-pregnadiene-11β,16α,17α-triol-3,20,21-trione 9α-bromo - 21-methyl-Δ$^{1,4}$-pregnadiene-11β,16α,17α-triol-3,20,21-trione 9α-iodo - 21 - methyl - Δ$^{1,4}$-pregnadiene-11β,16α,17α-triol-3,20,21-trione 9α-methoxy - 21 - methyl - Δ$^{1,4}$-pregnadiene-11β,16α,17α-triol-3,20,21-trione 9α-ethoxy - 21-methyl-Δ$^{1,4}$-pregnadiene-11β,16α,17α-triol-3,20,21-trione 21-methyl - Δ$^{1,4}$ - pregnadiene - 16α,17α - diol-3,11,20,21-tetrone 9α-fluoro - 21-methyl-Δ$^{1,4}$-pregnadiene-16α,17α-diol-3,11,20,21-tetrone 9α - chloro-21-methyl-Δ$^{1,4}$-pregnadiene-16α,17α-diol-3,11,20,21-tetrone 9α-bromo - 21-methyl-Δ$^{1,4}$-pregnadiene-16α,17α-diol-3,11,20,21-tetrone 9α-iodo - 21 - methyl-Δ$^{1,4}$-pregnadiene-16α,17α-diol-3,11,20,21-tetrone 9α-methoxy - 21 - methyl-Δ$^{1,4}$-pregnadiene-16α,17α-diol-3,11,20,21-tetrone 9α-ethoxy - 21-methyl-Δ$^{1,4}$-pregnadiene-16α,17α-diol-3,11,20,21-tetrone 6α-fluoro - 21-methyl-Δ$^{1,4}$-pregnadiene-11β,17α-diol-3,20,21-trione 6α,9α-difluoro - 21-methyl-Δ$^{1,4}$-pregnadiene-11β,17α-diol-3,20,21-trione 6α-fluoro-9α - chloro-21-methyl-Δ$^{1,4}$-pregnadiene-11β,17α-diol-3,20,21-trione 6α-fluoro-9α - bromo-21-methyl-Δ$^{1,4}$-pregnadiene-11β,17α-diol-3,20,21-trione 6α-fluoro-9α - iodo - 21-methyl-Δ$^{1,4}$-pregnadiene-11β,17α-diol-3,20,21-trione 6α-fluoro-9α - methoxy - 21-methyl-Δ$^{1,4}$-pregnadiene-11β,17α-diol-3,20,21-trione 6α-fluoro-9α - ethoxy - 21 - methyl-Δ$^{1,4}$-pregnadiene-11β,17α-diol-3,20,21-trione 6α-fluoro - 21-methyl-Δ$^{1,4}$-pregnadiene-17α-ol-3,11,20,21-tetrone 6α,9α - difluoro - 21-methyl-Δ$^{1,4}$-pregnadiene-17α-ol-3,11,20,21-tetrone 6α-fluoro - 9α - chloro-21-methyl-Δ$^{1,4}$-pregnadiene-17α-ol-3,11,20,21-tetrone 6α-fluoro - 9α - bromo-21-methyl-Δ$^{1,4}$-pregnadiene-17α-ol-3,11,20,21-tetrone 6α-fluoro - 9α - iodo - 21-methyl-Δ$^{1,4}$-pregnadiene-17α-ol-3,11,20,21-tetrone 6α-fluoro - 9α - methoxy-21-methyl-Δ$^{1,4}$-pregnadiene-17α-ol-3,11,20,21-tetrone 6α-fluoro - 9α - ethoxy-21-methyl-Δ$^{1,4}$-pregnadiene-17α-ol-3,11,20,21-tetrone 16α,21-dimethyl - Δ$^{1,4}$ - pregnadiene-11β,17α-diol-3,20,21-trione 16α,21-dimethyl - 9α - fluoro - Δ$^{1,4}$ - pregnadiene-11β,17α-diol-3,20,21-trione 16α,21-dimethyl - 9α - chloro - Δ$^{1,4}$-pregnadiene-11β,17α-diol-3,20,21-trione 16α,21-dimethyl - 9α - bromo - Δ$^{1,4}$-pregnadiene-11β,17α-diol-3,20,21-trione 16α,21-dimethyl - 9α - iodo-Δ$^{1,4}$-pregnadiene-11β,17α-diol-3,20,21-trione 16α,21-dimethyl - 9α - methoxy-Δ$^{1,4}$-pregnadiene-11β,17α-diol-3,20,21-trione 16α,21-dimethyl - 9α - ethoxy - Δ$^{1,4}$-pregnadiene-11β,17α-diol-3,20,21-trione 16α,21-dimethyl - Δ$^{1,4}$ - pregnadiene - 17α - ol-3,11,20,21-tetrone 16α,21-dimethyl - 9α-fluoro-Δ$^{1,4}$-pregnadiene-17α-ol-3,11,20,21-tetrone 16α,21-dimethyl - 9α-chloro-Δ$^{1,4}$-pregnadiene-17α-ol-3,11,20,21-tetrone 16α,21-dimethyl - 9α-bromo-Δ$^{1,4}$-pregnadiene-17α-ol-3,11,20,21-tetrone 16α,21-dimethyl - 9α - iodo - Δ$^{1,4}$-pregnadiene-17α-ol-3,11,20,21-tetrone 16α,21-dimethyl - 9α - methoxy - Δ$^{1,4}$-pregnadiene-17α-ol-3,11,20,21-tetrone 16α,21-dimethyl - 9α-ethoxy-Δ$^{1,4}$-pregnadiene-17α-ol-3,11,20,21-tetrone 21-methyl-Δ$^{4,6}$-pregnadiene-11β,17α-ol-3,20,21-trione 9α-fluoro - 21 - methyl-Δ$^{4,6}$-pregnadiene-11β,17α-ol-3,20,21-trione 9α-chloro - 21 - methyl-Δ$^{4,6}$-pregnadiene-11β,17α-ol-3,20,21-trione 9α-bromo - 21 - methyl-Δ$^{4,6}$-pregnadiene-11β,17α-ol-3,20,21-trione 9α-iodo-21 - methyl - Δ$^{4,6}$-pregnadiene-11β,17α-ol-3,20,21-trione 9α-methoxy - 21-methyl-Δ$^{4,6}$-pregnadiene-11β,17α-ol-3,20,21-trione 9α-ethoxy - 21 - methyl-Δ$^{4,6}$-pregnadiene-11β,17α-ol-3,20,21-trione 21-methyl-Δ$^{4,6}$-pregnadiene-17α-ol-3,11,20,21-tetrone 9α-fluoro - 21-methyl-Δ$^{4,6}$-pregnadiene-17α-ol-3,11,20,21-tetrone 9α-chloro - 21-methyl-Δ$^{4,6}$-pregnadiene-17α-ol-3,11,20,21-tetrone 9α-bromo - 21-methyl-Δ$^{4,6}$-pregnadiene-17α-ol-3,11,20,21-tetrone 9α-iodo - 21 - methyl-Δ$^{4,6}$-pregnadiene-17α-ol-3,11,20,21-tetrone 9α-methoxy - 21 - methyl-Δ$^{4,6}$-pregnadiene-17α-ol-3,11,20,21-tetrone 9α-ethoxy - 21-methyl-Δ$^{4,6}$-pregnadiene-17α-ol-3,11,20,21-tetrone 2α,21-dimethyl - Δ$^{4,6}$ - pregnadiene - 11β,17α-diol-3,20,21-trione 2α,21-dimethyl - 9α-fluoro-Δ$^{4,6}$-pregnadiene-11β,17α-diol-3,20,21-trione 2α,21-dimethyl - 9α-chloro-Δ$^{4,6}$-pregnadiene-11β,17α-diol-3,20,21-trione 2α,21-dimethyl - 9α-bromo-Δ$^{4,6}$-pregnadiene-11β,17α-diol-3,20,21-trione 2α,21-dimethyl - 9α - iodo-Δ$^{4,6}$-pregnadiene-11β,17α-diol-3,20,21-trione 2α,21-dimethyl - 9α - methoxy - Δ$^{4,6}$-pregnadiene-11β,17α-diol-3,20,21-trione 2α,21-dimethyl - 9α-ethoxy-Δ$^{4,6}$-pregnadiene-11β,17α-diol-3,20,21-trione 2α,21-dimethyl-Δ$^{4,6}$-pregnadiene-17α-ol-3,11,20,21-tetrone 2α,21-dimethyl - 9α - fluoro-Δ$^{4,6}$-pregnadiene-17α-ol-3,11,20,21-tetrone 2α,21-dimethyl - 9α - chloro-Δ$^{4,6}$-pregnadiene-17α-ol-3,11,20,21-tetrone 2α,21-dimethyl - 9α - bromo-Δ$^{4,6}$-pregnadiene-17α-ol-3,11,20,21-tetrone 2α,21-dimethyl - 9α - iodo - Δ$^{4,6}$-pregnadiene-17α-ol-3,11,20,21-tetrone 2α,21-dimethyl - 9α - methoxy - Δ$^{4,6}$-pregnadiene-17α-ol-3,11,20,21-tetrone 2α,21-dimethyl - 9α - ethoxy-Δ$^{4,6}$-pregnadiene-17α-ol-3,11,20,21-tetrone 6,21-dimethyl-Δ$^{4,6}$-pregnadiene - 11β,17α - diol - 3,20,21-trione 6,21-dimethyl-9α-fluoro-Δ$^{4,6}$-pregnadiene - 11β,17α - diol-3,20,21-trione 6,21-dimethyl-9α-chloro-Δ$^{4,6}$-pregnadiene - 11β,17α - diol-3,20,21 trione 6,21-dimethyl-9α-bromo-Δ$^{4,6}$-pregnadiene - 11β,17α - diol 3,20,21-trione 6,21dimethyl-9α-iodo-Δ$^{4,6}$ - pregnadiene - 11β,17α - diol-3,20,21-trione 6,21-dimethyl-9α - methoxy - Δ$^{4,6}$ - pregnadiene - 11β,17α-diol-3,20,21-trione 6,21-dimethyl-9α-ethoxy-Δ$^{4,6}$-pregnadiene - 11β,17α - diol-3,20,21-trione 6,21-dimethyl-Δ$^{4,6}$-pregnadiene-17α-ol-3,11,20,21-tetrone 6,21-dimethyl-19α-fluoro-Δ$^{4,6}$-pregnadiene - 17α - ol - 3,11,20,21-tetrone 6,21-dimethyl-9α-chloro-Δ$^{4,6}$-pregnadiene - 17α - ol - 3,11,20,21-tetrone 6,21-dimethyl-19α-bromo-Δ$^{4,6}$-pregnadiene-17α - ol - 3,11,20,21-tetrone 6,21-dimethyl-9α-iodo-Δ$^{4,6}$-pregnadiene - 17α - ol - 3,11,20,21-tetrone 6,21-dimethyl-9α-methoxy-Δ$^{4,6}$-pregnadiene - 17α - ol - 3,11,20,21-tetrone 6,21-dimethyl-9α-ethoxy-Δ$^{4,6}$-pregnadiene - 17α - ol - 3,11,20,21-tetrone 21-methyl-Δ$^{4,6}$-pregnadiene-11β,14α,17α - triol - 3,20,21-trione 9α-fluoro-21-methyl-Δ$^{4,6}$-pregnadiene - 11β,14α,17α - triol-3,20,21-trione 9α-chloro-21-methyl-Δ$^{4,6}$-pregnadiene - 11β,14α,17α - triol-3,20,21-trione 9α-bromo-21-methyl-Δ$^{4,6}$-pregnadiene-11β,14α,17α - triol-3,20,21-trione 9α-iodo-21-methyl-Δ$^{4,6}$-pregnadiene - 11β,14α,17α - triol-3,20,21-trione 9α-methoxy-21-methyl - Δ$^{4,6}$ - pregnadiene - 11β,14α,17α-triol-3,20,21-trione 9α-ethoxy-21-methyl-Δ$^{4,6}$-pregnadiene-11β,14α,17α - triol-3,20,21-trione 21-methyl-Δ$^{4,6}$-pregnadiene - 14α,17α - diol - 3,11,20,21-tetrone 9α-fluoro-21-methyl-Δ$^{4,6}$-pregnadiene - 14α,17α-diol - 3,11,20,21-tetrone 9α-chloro-21-methyl-Δ$^{4,6}$-pregnadiene - 14α,17α - diol - 3,11,20,21-tetrone 9α-bromo-21-methyl-Δ$^{4,6}$-pregnadiene - 14α,17α-diol - 3,11,20,21-tetrone 9α-iodo-21-methyl-Δ$^{4,6}$-pregnadiene - 14α,17α-diol - 3,11,20,21-tetrone 9α-methoxy-21-methyl-Δ$^{4,6}$-pregnadiene-14α,17α - diol - 3,11,20,21-tetrone 9α-ethoxy-21-methyl-Δ$^{4,6}$-pregnadiene - 14α,17α - diol - 3,11,20,21-tetrone 21-methyl-Δ$^{4,6}$-pregnadiene - 11β,16α,17α - triol - 3,20,21-trione 9α-fluoro-21-methyl-Δ$^{4,6}$-pregnadiene-11β,16α,17α - triol-3,20,21-trione 9α-chloro-21-methyl-Δ$^{4,6}$-pregnadiene - 11β,16α,17α - triol-3,20-21-trione 9α-bromo-21-methyl-Δ$^{4,6}$-pregnadiene-11β,16α17α-triol - 3,20,21-trione 9α-iodo-21-methyl-Δ$^{4,6}$-pregnadiene-11β,16α,17α - triol - 3,20,21-trione 9α-methoxy-21-methyl-Δ$^{4,6}$ - pregnadiene - 11β,16α,17α-triol-3,20,21-trione 9α-ethoxy-21-methyl-Δ$^{4,6}$-pregnadiene-11β,16α,17α - triol-3,20,21-trione 21-methyl-Δ$^{4,6}$-pregnadiene - 16α,17α - diol - 3,11,20,21-tetrone 9α-fluoro-21-methyl-Δ$^{4,6}$-pregnadiene - 16α,17α - diol - 3,11,20,21-tetrone 9α-chloro-21-methyl-Δ$^{4,6}$-pregnadiene-16α,17α - diol - 3,11,20,21-tetrone 9α-bromo-21-methyl-Δ$^{4,6}$-pregnadiene - 16α,17α - diol - 3,11,20,21-tetrone 9α-iodo-21-methyl-Δ$^{4,6}$-pregnadiene - 16α,17α - diol - 3,11,20,21-tetrone 9α-methoxy-21-methyl-Δ$^{4,6}$-pregnadiene-16α,17α - diol - 3,11,20,21-tetrone 9α-ethoxy-21-methyl-Δ$^{4,6}$-pregnadiene - 16α,17α - diol - 3,11,20,21-tetrone 16α,21-dimethyl-Δ$^{4,6}$-pregnadiene - 11β,17α - diol - 3,20,21-trione 16α,21-dimethyl-9α-fluoro - Δ$^{4,6}$ - pregnadiene - 11β,17α-diol-3,20,21-trione 16α,21-dimethyl-9α-chloro - Δ$^{4,6}$ - pregnadiene - 11β,17α-diol-3,20,21-trione
16α,21-dimethyl-9α-bromo - Δ$^{4,6}$ - pregnadiene - 11β,17α-diol-3,20,21-trione
16α,21-dimethyl-9α-iodo-Δ$^{4,6}$-pregnadiene - 11β,17α - diol-3,20,21-trione
16α,21-dimethyl-9α-methoxy-Δ$^{4,6}$ - pregnadiene - 11β,17α-diol-3,20,21-trione
16α,21-dimethyl-9α-ethoxy - Δ$^{4,6}$ - pregnadiene - 11β,17α-diol-3,20,21-trione
16α,21-dimethyl-Δ$^{4,6}$ - pregnadiene - 17α - ol - 3,11,20,21-tetrone
16α,21-dimethyl-9α-fluoro-Δ$^{4,6}$ - pregnadiene - 17α - ol - 3,11,20,21-tetrone
16α,21-dimethyl-9α-chloro-Δ$^{4,6}$-pregnadiene - 17α - ol - 3,11,20,21-tetrone
16α,21-dimethyl-9α-bromo-Δ$^{4,6}$-pregnadiene - 17α - ol - 3,11,20,21-tetrone
16α,21-dimethyl-9α-iodo-Δ$^{4,6}$-pregnadiene-17α - ol - 3,11,20,21-tetrone
16α,21-dimethyl-9α-methoxy-Δ$^{4,6}$-pregnadiene - 17α - ol-3,11,20,21-tetrone
16α,21-dimethyl-9α-ethoxy-Δ$^{4,6}$-pregnadiene - 17α - ol - 3,11,20,21-tetrone
9α-fluoro-21-methyl-Δ$^{1,4,6}$-pregnatriene - 11β,17α - diol - 3,20,21-trione
9α-chloro-21-methyl-Δ$^{1,4,6}$-pregnatriene-11β,17α - diol - 3,20,21-trione
9α-bromo-21-methyl-Δ$^{1,4,6}$-pregnatriene - 11β,17α - diol-3,20,21-trione
9α-iodo-21-methyl-Δ$^{1,4,6}$-pregnatriene - 11β,17α - diol - 3,20,21-trione
9α-methoxy-21-methyl-Δ$^{1,4,6}$-pregnatriene - 11β,17α - diol-3,20,21-trione
9α-ethoxy-21-methyl-Δ$^{1,4,6}$-pregnatriene-11β,17α - diol - 3,20,21-trione
21-methyl-Δ$^{1,4,6}$-pregnatriene-17α-ol-3,11,20,21-tetrone
9α-fluoro-21-methyl-Δ$^{1,4,6}$-pregnatriene - 17α -ol - 3,11,20,21-tetrone
9α-chloro-21-methyl-Δ$^{1,4,6}$-pregnatriene - 17α - ol - 3,11,20,21-tetrone
9α-bromo-21-methyl-Δ$^{1,4,6}$-pregnatriene - 17α - ol - 3,11,20,21-tetrone
9α-iodo-21-methyl-Δ$^{1,4,6}$-pregnatriene - 17α - ol - 3,11,20,21-tetrone
9α-methoxy-21-methyl-Δ$^{1,4,6}$-pregnatriene - 17α - ol-3,11,20,21-tetrone
9α-ethoxy-21-methyl-Δ$^{1,4,6}$-pregnatriene - 17α - ol - 3,11,20,21-tetrone
2,21-methyl-Δ$^{1,4,6}$-pregnatriene-17α-ol-3,20,21-trione
9α-fluoro-21-methyl-Δ$^{1,4,6}$-pregnatriene - 17α - ol - 3,20,21-trione
9α-chloro-21-methyl-Δ$^{1,4,6}$-pregnatriene - 17α - ol - 3,20,21-trione
9α-bromo-21-methyl-Δ$^{1,4,6}$-pregnatriene -17α - ol - 3,20,21-trione
9α-iodo-21-methyl-Δ$^{1,4,6}$-pregnatriene - 17α - ol - 3,20,21-trione
9α-methoxy-21-methyl-Δ$^{1,4,6}$-pregnatriene - 17α - ol - 3,20,21-trione
9α-ethoxy-21-methyl-Δ$^{1,4,6}$-pregnatriene - 17α - ol - 3,20,21-trione
2,21-dimethyl-Δ$^{1,4,6}$-pregnatriene-3,11,20,21-tetrone
2,21-dimethyl-9α-fluoro-Δ$^{1,4,6}$ - pregnatriene - 3,11,20,21-tetrone
2,21-dimethyl-9α-chloro-Δ$^{1,4,6}$ - pregnatriene - 3,11,20,21-tetrone
2,21-dimethyl-9α-bromo-Δ$^{1,4,6}$ - pregnatriene - 3,11,20,21-tetrone
2,21-dimethyl-9α-iodo - Δ$^{1,4,6}$ - pregnatriene - 3,11,20,21-tetrone
2,21-dimethyl-9α-methoxy-Δ$^{1,4,6}$-pregnatriene - 3,11,20,21-tetrone
2,21-dimethyl-9α-ethoxy-Δ$^{1,4,6}$ - pregnatriene - 3,11,20,21-tetrone
6,21-dimethyl-Δ$^{1,4,6}$-pregnatriene - 11β,17α - diol - 3,20,21-trione
6,21-dimethyl-9α-fluoro-Δ$^{1,4,6}$-pregnatriene-11β,17α - diol-3,20,21-trione
6,21-dimethyl-9α-chloro-Δ$^{1,4,6}$-pregnatriene-11β,17α - diol-3,20,21-trione
6,21-dimethyl-9α-bromo-Δ$^{1,4,6}$-pregnatriene-11β,17α - diol-3,20,21-trione
6,21-dimethyl-9α-iodo-Δ$^{1,4,6}$-pregnatriene - 11β,17α - diol-3,20,21-trione
6,21-dimethyl-9α-methoxy-Δ$^{1,4,6}$ - pregnatriene - 11β,17α-diol-3,20,21-trione
6,21-dimethyl-9α-ethoxy-Δ$^{1,4,6}$ - pregnatriene - 11β,17α-diol-3,20,21-trione
6,21-dimethyl-Δ$^{1,4,6}$-pregnatriene - 17α - ol - 3,11,20,21-tetrone
6,21-dimethyl-9α-fluoro-Δ$^{1,4,6}$-pregnatriene - 17α - ol - 3,11,20,21-tetrone
6,21-dimethyl-9α-chloro-Δ$^{1,4,6}$-pregnatriene - 17α - ol - 3,11,20,21-tetrone
6,21-dimethyl-9α-bromo-Δ$^{1,4,6}$-pregnatriene - 17α - ol - 3,11,20,21-tetrone
6,21-dimethyl-9α-iodo-Δ$^{1,4,6}$-pregnatriene - 17α - ol - 3,11,20,21-tetrone
6,21-dimethyl-9α-methoxy-Δ$^{1,4,6}$-pregnatriene - 17α - ol - 3,11,20,21-tetrone
6,21-dimethyl-9α-ethoxy-Δ$^{1,4,6}$-pregnatriene - 17α - ol - 3,11,20,21-tetrone.
21-methyl-Δ$^{1,4,6}$-pregnatriene - 11β,14α,17α - triol-3,20,21-trione
9α-fluoro - 21 - methyl-Δ$^{1,4,6}$-pregnatriene-11β,14α,17α-triol-3,20,21-trione
9α-chloro - 21 - methyl - Δ$^{1,4,6}$-pregnatriene-11β,14α,17α-triol-3,20,21-trione
9α-bromo - 21 - methyl-Δ$^{1,4,6}$-pregnatriene-11β,14α,17α-triol-3,20,21-trione
9α-iodo - 21 - methyl - Δ$^{1,4,6}$-pregnatriene-11β,14α,17α-triol-3,20,21-trione
9α-methoxy - 21 - methyl-Δ$^{1,4,6}$-pregnatriene-11β,14α,17α-triol-3,20,21-trione
9α-ethoxy - 21 - methyl-Δ$^{1,4,6}$-pregnatriene-11β,14α,17α-triol-3,20,21-trione
21-Methyl - Δ$^{1,4,6}$ - pregnatriene-14α,17α-diol-3,11,20,21-tetrone
9α-fluoro - 21 - methyl-Δ$^{1,4,6}$-pregnatriene-14α,17α - diol-3,11,20,21-tetrone
9α-chloro - 21 - methyl-Δ$^{1,4,6}$-pregnatriene - 14α,17α-diol-3,11,20,21-tetrone
9α-bromo - 21 - methyl - Δ$^{1,4,6}$-pregnatriene-14α,17α-diol-3,11,20,21-tetrone
9α-iodo - 21 - methyl-Δ$^{1,4,6}$-pregnatriene - 14α,17α - diol-3,11,20,21-tetrone
9α-methoxy-21-methyl - Δ$^{1,4,6}$-pregnatriene-14α,17α-diol-3,11,20,21-tetrone
9α-ethoxy - 21 - methyl-Δ$^{1,4,6}$-pregnatriene-14α,17α-diol-3,11,20,21-tetrone
21-methyl - Δ$^{1,4,6}$ - pregnatriene - 11β,16α,17α-triol-3,20,21-trione
9α-fluoro - 21 - methyl-Δ$^{1,4,6}$-pregnatriene-11β,16α,17α-triol-3,20,21-trione
9α-chloro - 21 - methyl-Δ$^{1,4,6}$-pregnatriene-11β,16α,17α-triol-3,20,21-trione
9α-bromo - 21 - methyl - Δ$^{1,4,6}$-pregnatriene-11β,16α,17α-triol-3,20,21-trione
9α-iodo - 21 - methyl - Δ$^{1,4,6}$ - pregnatriene-11β,16α,17α-triol-3,20,21-trione
9α-methoxy - 21 - methyl-Δ$^{1,4,6}$-pregnatriene-11β,16α,17α-triol-3,20,21-trione
9α-ethoxy - 21 - methyl-Δ$^{1,4,6}$-pregnatriene-11β,16α,17α-triol-3,20,21-trione 21-methyl - $\Delta^{1,4,6}$ - pregnatriene-16α,17α-diol-3,11,20,21-tetrone 9α-fluoro - 21 - methyl-$\Delta^{1,4,6}$-pregnatriene - 16α,17α-diol-3,11,20,21-tetrone 9α-chloro - 21 - methyl - $\Delta^{1,4,6}$-pregnatriene-16α,17α-diol-3,11,20,21-tetrone 9α-bromo - 21 - methyl - $\Delta^{1,4,6}$-pregnatriene-16α,17α-diol-3,11,20,21-tetrone 9α-iodo - 21 - methyl - $\Delta^{1,4,6}$ - pregnatriene-16α,17α-diol-3,11,20,21-tetrone 9α-methoxy - 21 - methyl-$\Delta^{1,4,6}$-pregnatriene-16α,17α-diol-3,11,20,21-tetrone 9α-ethoxy - 21 - methyl $\Delta^{1,4,6}$-pregnatriene-16α,17α-diol-3,11,20,21-tetrone 16α,21-dimethyl - $\Delta^{1,4,6}$ - pregnatriene-11β,17α-diol-3,20,21-trione 16α,21-dimethyl - 9α - fluoro - $\Delta^{1,4,6}$-pregnatriene-11β,17α-diol-3,20,21-trione 16α,21-dimethyl - 9α - chloro-$\Delta^{1,4,6}$-pregnatriene-11β,17α-diol-3,20,21-trione 16α,21-dimethyl - 9α - bromo-$\Delta^{1,4,6}$-pregnatriene-11β,17α-diol-3,20,21-trione 16α,21-dimethyl - 9α - iodo-$\Delta^{1,4,6}$-pregnatriene - 11β,17α-diol-3,20,21-trione 16α,21-dimethyl - 9α - methoxy-$\Delta^{1,4,6}$ - pregnatriene - 11β,17α-diol-3,20,21-trione 16α,21-dimethyl - 9α-ethoxy-$\Delta^{1,4,6}$-pregnatriene-11β,17α-diol-3,20,21-trione 16α,21-dimethyl - $\Delta^{1,4,6}$ - pregnatriene-17α-ol-3,11,20,21-tetrone 16α,21-dimethyl - 9α - fluoro - $\Delta^{1,4,6}$-pregnatriene-17α-ol-3,11,20,21-tetrone 16α,21-dimethyl - 9α - chloro - $\Delta^{1,4,6}$-pregnatriene-17α-ol-3,11,20,21-tetrone 16α,21-dimethyl - 9α - bromo - $\Delta^{1,4,6}$-pregnatriene-17α-ol-3,11,20,21-tetrone 16α,21-dimethyl - 9α - iodo - $\Delta^{1,4,6}$ - pregnatriene-17α-ol-3,11,20,21-tetrone 16α,21-dimethyl-9α-methoxy - $\Delta^{1,4,6}$ - pregnatriene-17α-ol-3,11,20,21-tetrone 16α,21-dimethyl - 9α - ethoxy-$\Delta^{1,4,6}$-pregnatriene-17α-ol-3,11,20,21-tetrone 16-methylene - 9α-fluoro-21-methyl-$\Delta^{4}$-pregnene-11β,17α-diol-3,20,21-trione 16-methylene-9α-chloro-21-methyl - $\Delta^{4}$-pregnene-11β,17α-diol-3,20,21-trione 16-methylene-9α-bromo-21-methyl - $\Delta^{4}$-pregnene-11β,17α-diol-3,20,21-trione 16-methylene-9α-iodo-21-methyl - $\Delta^{4}$-pregnene - 11β,17α-diol-3,20,21-trione 16-methylene-9α-methoxy-21 - methyl - $\Delta^{4}$-pregnene - 11β,17α-diol-3,20,21-trione 16-methylene-9α-ethoxy-21-methyl - $\Delta^{4}$-pregnene-11β,17α-diol-3,20,21-trione 16-methylene-9α-fluoro-21-methyl - $\Delta^{4}$ - pregnene-17α-ol-3,11,20,21-tetrone 16-methylene-9α-chloro-21-methyl - $\Delta^{4}$ - pregnene-17α-ol-3,11,20,21-tetrone 16-methylene-9α-bromo-21-methyl - $\Delta^{4}$ - pregnene-17α-ol-3,11,20,21-tetrone 16-methylene-9α-iodo-21-methyl - $\Delta^{4}$ - pregnene - 17α-ol-3,11,20,21-tetrone 16-methylene-9α-methoxy-21-methyl - $\Delta^{4}$-pregnene-17α-ol-3,11,20,21-tetrone 16-methylene-9α-ethoxy-21-methyl - $\Delta^{4}$ - pregnene-17α-ol-3,11,20,21-tetrone 16-methylene-9α-fluoro - 21 - methyl - $\Delta^{1,4}$ - pregnadiene-11β,17α-diol-3,20,21-trione 16-methylene-9α-chloro - 21 - methyl - $\Delta^{1,4}$ - pregnadiene-11β,17α-diol-3,20,21-trione 16-methylene-9α-bromo - 21 - methyl - $\Delta^{1,4}$ - pregnadiene-11β,17α-diol-3,20,21-trione 16-methylene-9α - iodo - 21 - methyl - $\Delta^{1,4}$ - pregnadiene-11β,17α-diol-3,20,21-trione 16-methylene-9α-methoxy - 21 - methyl-$\Delta^{1,4}$ - pregnadiene-11β,17α-diol-3,20,21-trione 16-methylene-9α-ethoxy - 21 - methyl - $\Delta^{1,4}$ - pregnadiene-11β,17α-diol-3,20,21-trione 16-methylene - 21 - methyl - $\Delta^{1,4}$ - pregnadiene - 17α-ol-3,11,20,21-tetrone 16-methylene-9α-fluoro - 21 - methyl - $\Delta^{1,4}$-pregnadiene-17α-ol-3,11,20,21-tetrone 16-methylene-9α-chloro - 21 - methyl - $\Delta^{1,4}$ - pregnadiene-17α-ol-3,11,20,21-tetrone 16-methylene-9α-bromo - 21 - methyl - $\Delta^{1,4}$ - pregnadiene 17α-ol-3,11,20,21-tetrone 16-methylene-9α - iodo - 21 - methyl - $\Delta^{1,4}$ - pregnadiene-17α-ol-3,11,20,21-tetrone 16-methylene-9α-methoxy-21-methyl - $\Delta^{1,4}$ - pregnadiene-17α-ol-3,11,20,21-tetrone 16-methylene-9α-ethoxy - 21 - methyl - $\Delta^{1,4}$-pregnadiene-17α-ol-3,11,20,21-tetrone 16-methylene - 21 - methyl - $\Delta^{4,6}$-pregnadiene-11β,17α-ol-3,20,21-trione 16-methylene-9α-fluoro - 21 - methyl - $\Delta^{4,6}$ - pregnadiene-11β,17α-ol-3,20,21-trione 16-methylene-9α-chloro - 21 - methyl - $\Delta^{4,6}$ - pregnadiene-11β,17α-ol-3,20,21-trione 16-methylene-9α-bromo - 21 - methyl - $\Delta^{4,6}$ - pregnadiene-11β,17α-ol-3,20,21-trione 16-methylene-9α-iodo - 21 - methyl - $\Delta^{4,6}$ - pregnadiene-11β,17α-ol-3,20,21-trione 16-methylene-9α-methoxy - 21 - methyl-$\Delta^{4,6}$-pregnadiene-11β,17α-ol-3,20,21-trione 16-methylene-9α-ethoxy - 21 - methyl - $\Delta^{4,6}$-pregnadiene-11β,17α-ol-3,20,21-trione 16-methylene - 21 - methyl - $\Delta^{4,6}$-pregnadiene-17α-ol-3,11,20,21-tetrone 16-methylene-9α-fluoro - 21 - methyl - $\Delta^{4,6}$-pregnadiene-17α-ol-3,11,20,21-tetrone 16-methylene-9α-chloro - 21 - methyl - $\Delta^{4,6}$ - pregnadiene-17α-ol-3,11,20,21-tetrone 16-methylene-9α-bromo - 21 - methyl - $\Delta^{4,6}$-pregnadiene-17α-ol-3,11,20,21-tetrone 16-methylene-9α - iodo - 21 -methyl - $\Delta^{4,6}$ - pregnadiene-17α-ol-3,11,20,21-tetrone 16-methylene-9α-methoxy - 21 - methyl-$\Delta^{4,6}$-pregnadiene-17α-ol-3,11,20,21-tetrone 16-methylene - 9α - ethoxy - 21 - methyl-$\Delta^{4,6}$-pregnadiene-17α-ol-3,11,20,21-tetrone 16-methylene - 9α-fluoro-21-methyl - $\Delta^{1,4,6}$ - pregnatriene-11β,17α-diol-3,20,21-trione 16-methylene-9α-chloro-21-methyl - $\Delta^{1,4,6}$ - pregnatriene-11β,17α-diol-3,20,21-trione 16-methylene-9α-bromo-21-methyl - $\Delta^{1,4,6}$ - pregnatriene-11β,17α-diol-3,20,21-trione 16 - methylene-9α-iodo-21-methyl - $\Delta^{1,4,6}$ - pregnatriene-11β,17α-diol-3,20,21-trione 16-methylene-9α-methoxy-21-methyl - $\Delta^{1,4,6}$-pregnatriene-11β,17α-diol-3,20,21-trione 16-methylene-9α-ethoxy-21-methyl - $\Delta^{1,4,6}$ - pregnatriene-11β,17α-diol-3,20,21-trione 16-methylene-21-methyl-$\Delta^{1,4,6}$-pregnatriene - 17α-ol-3,11,20,21-tetrone 16-methylene-9α-fluoro-21-methyl - $\Delta^{1,4,6}$ - pregnatriene-17α-ol-3,11,20,21-tetrone 16-methylene-9α-chloro-21-methyl - $\Delta^{1,4,6}$ - pregnatriene-17α-ol-3,11,20,21-tetrone 16-methylene-9α-bromo-21-methyl - $\Delta^{1,4,6}$ - pregnatriene-17α-ol-3,11,20,21-tetrone 16-methylene-9α-iodo - 21 - methyl - $\Delta^{1,4,6}$ - pregnatriene-17α-ol-3,11,20,21-tetrone 16-methylene-9α-methoxy-21-methyl - $\Delta^{1,4,6}$-pregnatriene-17α-ol-3,11,20,21-tetrone 16-methylene-9α-ethoxy-21-methyl - Δ$^{1,4,6}$ - pregnatriene-17α-ol-3,11,20,21-tetrone 9α,16α-difluoro-21-methyl - Δ$^4$ - pregnene - 11β,17α-diol-3,20,21-trione 16α-fluoro-9α-chloro-21-methyl-Δ$^4$-pregnene-11β,17α-diol-3,20,21-trione 16α-fluoro-9α-bromo-21-methyl-Δ$^4$-pregnene-11β,17α-diol-3,20,21-trione 16α-fluoro-9α-iodo-21-methyl-Δ$^4$-pregnene - 11β,17α-diol-3,20,21-trione 16α-fluoro-9α-methoxy-21-methyl-Δ$^4$-pregnene - 11β,17α-diol-3,20,21-trione 16α-fluoro-9α-ethoxy-21-methyl-Δ$^4$-pregnene-11β,17α-diol-3,20,21-trione 9α,16α-difluoro-21-methyl-Δ$^4$-pregnene-17α - ol - 3,11,20,21-tetrone 16α-fluoro-9α-chloro-21-methyl-Δ$^4$-pregnene-17α-ol - 3,11,20,21-tetrone 16α-fluoro-9α-bromo-21-methyl-Δ$^4$-pregnene-17α - ol-3,11,20,21-tetrone 16α-fluoro-9α-iodo-21-methyl-Δ$^4$-pregnene-17α - ol - 3,11,20,21-tetrone 16α-fluoro-9α-methoxy-21-methyl-Δ$^4$-pregnene-17α - ol-3,11,20,21-tetrone 16α-fluoro-9α-ethoxy-21-methyl-Δ$^4$-pregnene - 17α-ol-3,11,20,21-tetrone 9α,16α-difluoro-21-methyl-Δ$^{1,4}$-pregnadiene-11β,17α - diol-3,20,21-trione 16α-fluoro-9α-chloro-21-methyl-Δ$^{1,4}$-pregnadiene-11β,17α-diol-3,20,21-trione 16α-fluoro-9α-bromo-21-methyl-Δ$^{1,4}$-pregnadiene-11β,17α-diol-3,20,21-trione 16α-fluoro-9α-iodo-21-methyl-Δ$^{1,4}$-pregnadiene - 11β,17α-diol-3,20,21-trione 16α-fluoro-9α-methoxy-21-methyl-Δ$^{1,4}$-pregnadiene - 11β,17α-diol-3,20,21-trione 16α-fluoro-9α-ethoxy-21-methyl-Δ$^{1,4}$-pregnadiene-11β,17α-diol-3,20,21-trione 16α-fluoro-21-methyl-Δ$^{1,4}$-pregnadiene-17α-ol - 3,11,20,21-tetrone 9α,16α-difluoro-21-methyl-Δ$^{1,4}$-pregnadiene - 17α-ol-3,11,20,21-tetrone 16α-fluoro-9α-chloro-21-methyl-Δ$^{1,4}$-pregnadiene-17α - ol-3,11,20,21-tetrone 16α-fluoro-9α-bromo-21-methyl-Δ$^{1,4}$-pregnadiene - 17α-ol-3,11,20,21-tetrone 16α-fluoro-9α-iodo-21-methyl-Δ$^{1,4}$-pregnadiene - 17α - ol-3,11,20,21-tetrone 16α-fluoro-9α-methoxy-21-methyl-Δ$^{1,4}$-pregnadiene - 17α-ol-3,11,20,21-tetrone 16α-fluoro-9α-ethoxy-21-methyl-Δ$^{1,4}$-pregnadiene-17α - ol-3,11,20,21-tetrone 16α-fluoro-21-methyl-Δ$^{4,6}$-pregnadiene-11β,17α-ol-3,20,21-trione 9α,16α-difluoro-21-methyl-Δ$^{4,6}$-pregnadiene - 11β,17α - ol-3,20,21-trione 16α-fluoro-9α-chloro-21-methyl-Δ$^{4,6}$-pregnadiene-11β,17α-3,20,21-trione 16α-fluoro-9α-bromo-21-methyl-Δ$^{4,6}$-pregnadiene-11β,17α-ol-3,20,21-trione 16α-fluoro-9α-iodo-21-methyl-Δ$^{4,6}$-pregnadiene - 11β,17α-ol-3,20,21-trione 16α-fluoro-9α-methoxy-21-methyl-Δ$^{4,6}$-pregnadiene - 11β,17α-ol-3,20,21-trione 16α-fluoro-9α-ethoxy-21-methyl - Δ$^{4,6}$ - pregnadiene - 11β,17α-ol-3,20,21-trione 16α-fluoro-21-methyl-Δ$^{4,6}$-pregnadiene-17α-ol - 3,11,20,21-tetrone 9α,16α-difluoro-21-methyl-Δ$^{4,6}$-pregnadiene - 17α-ol-3,11,20,21-tetrone 16α-fluoro-9α-chloro-21-methyl-Δ$^{4,6}$-pregnadiene - 17α-ol-3,11,20,21-tetrone 16α-fluoro-9α-bromo-21-methyl-Δ$^{4,6}$-pregnadiene - 17α-ol-3,11,20,21-tetrone 16α-fluoro-9α-iodo-21-methyl-Δ$^{4,6}$-pregnadiene - 17α - ol-3,11,20,21-tetrone 16α-fluoro-9α-methoxy-21-methyl-Δ$^{4,6}$-pregnadiene - 17α-ol-3,11, 20,21-tetrone 16α-fluoro-9α-ethoxy-21-methyl-Δ$^{4,6}$-pregnadiene - 17α-ol-3,11,20,21-tetrone 9α,16α-difluoro-21-methyl - Δ$^{1,4,6}$ - pregnatriene-11β,17α-diol-3,20,21-trione 16α-fluoro-9α-chloro-21-methyl-Δ$^{1,4,6}$ - pregnatriene - 11β,17α-diol-3,20,21-trione 16α-fluoro-9α-bromo-21-methyl-Δ$^{1,4,6}$-pregnatriene - 11β, 17α-diol-3,20,21-trione 16α-fluoro-9α-iodo-21-methyl - Δ$^{1,4,6}$ - pregnatriene - 11β, 17α-diol-3,20,21-trione 16α-fluoro-9α-methoxy-21-methyl-Δ$^{1,4,6}$-pregnatriene-11β, 17α-diol-3,20,21-trione 16α-fluoro-9α-ethoxy-21-methyl-Δ$^{1,4,6}$-pregnatriene - 11β, 17α-diol-3,20,21-trione 16α-fluoro-21-methyl-Δ$^{1,4,6}$-pregnatriene - 17α-ol-3,11,20,21-tetrone 9α,16α-difluoro-21-methyl - Δ$^{1,4,6}$ - pregnatriene - 17α-ol-3,11,20,21-tetrone 16α-fluoro-9α-chloro-21-methyl - Δ$^{1,4,6}$ - pregnatriene-17α-ol-3,11,20,21-tetrone 16α - fluoro - 9α-bromo-21-methyl-Δ$^{1,4,6}$-pregnatriene-17α-ol-3,11,20,21-tetrone 16α - fluoro - 9α-iodo-21-methyl-Δ$^{1,4,6}$-pregnatriene - 17α-ol-3,11,20,21-tetrone 16α - fluoro - 9α-methoxy-21-methyl-Δ$^{1,4,6}$-pregnatriene-17α-ol-3,11,20,21-tetrone 16α-fluoro-9α-ethoxy-21-methyl-Δ$^{1,4,6}$-pregnatriene - 17α-ol-3,11,20,21-tetrone 6α-chloro-9α-fluoro-21-methyl-Δ$^4$-pregnene - 11β,17α-diol-3,20,21-trione 6α,9α-dichloro-9α-chloro-21-methyl - Δ$^4$ - pregnene - 11β, 17α-diol-3,20,21-trione 6α-chloro - 9α - bromo-21-methyl-Δ$^4$-pregnene - 11β,17α-diol-3,20,21-trione 6α-chloro-9α-iodo-21-methyl-Δ$^4$-pregnene - 11β,17α - diol-3,20,21-trione 6α-chloro-9α-methoxy-21-methyl-Δ$^4$-pregnene - 11β,17α-diol-3,20,21-trione 6α - chloro - 9α-ethoxy-21-methyl-Δ$^4$-pregnene-11β,17α-diol-3,20,21-trione The following procedure illustrates a method of converting the 17β-pyruvoyl compounds, prepared by the process of this invention into useful adrenocortically active steroids substituted at the 17β-position with an α-hydroxy propanoyl group.

21-METHYL-Δ$^{1,4}$-PREGNADIENE-11β,17α,21-TRIOL-3,20-DIONE

A solution containing 500 mg. of 21-methyl-Δ$^{1,4}$-pregnadiene-11β,17α-diol-3,20,21-trione in 100 ml. of ethanol is added to a stirred solution of 200 grams of sucrose in 1500 ml. of water. A suspension containing 35 grams of *Saccharomyces cerevisiae* obtained by growing the microorganism in a suitable nutrient medium, filtering and drying the filtrate in 200 ml. of water was prepared in a separate vessel and maintained at approximately 40° C. At the end of a one-hour period, the steroid solution was added to this suspension and the reaction mixture stirred gently so as to maintain anaerobic conditions. The reaction is continued for from 56 to 72 hours. During this time, the pH is maintained within the range of from about 4.5 to about 5.0 by the addition of 1.5 N ammonium hydroxide. At the end of the first twenty-four hours, an additional 40 grams of sucrose and 7 grams of *Saccharomyces cerevisiae* suspension in 34 ml. of water and 2 ml. of ethanol is added. At the end of a forty-eight hour period, an additional 7 grams of yeast in 34 ml. of water and 2 ml. of ethanol is added.

The desired material is isolated by extracting the filtrate from which the insolubles have been removed with 4 separate 250 ml. portions of chloroform. The combined chloroform extracts are washed twice with 1/10 volumes of 5% aqueous sodium bicarbonate and again with a 1/10 volume of water. The organic layer is separated, dried over anhydrous sodium sulfate, filtered and the desired product recovered by evaporating the filtrate in vacuo.

What is claimed is:

1. A process for the preparation of a compound having the formula:

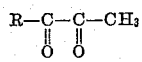

wherein R is a cyclopentanopolyhydrophenanthrene nucleus having adrenocortical activity when substituted at the 17β-position with an α-hydroxy acetyl group and the pyruvoyl group is located at the 17β-position replacing the α-hydroxy acetyl group which comprises maintaining a 17β-(α-hydroxy-β-halo)-propanoyl compound having the formula:

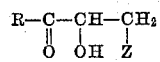

wherein R has the same meaning as above and Z is selected from the group consisting of bromine, chlorine and iodine in a lower polar aliphatic oxygenated solvent containing up to eight carbon atoms for a period of from about one to about four hours at a temperature of from about 50° C. to about 165° C. and, in the case where the halogen atom is chlorine, carrying out the reaction in the presence of a mineral acid.

2. A process as in claim 1 wherein the 17β-(α-hydroxy-β-halo)-propanoyl group is a 17β-(α-hydroxy-β-bromo)-propanoyl group.

3. A process as in claim 1 wherein the 17β-(α-hydroxy-β-halo)-propanoyl group is a 17β-(α-hydroxy-β-chloro)-propanoyl group.

4. A process as in claim 1 wherein the 17β-(α-hydroxy-β-halo)-propanoyl group is a 17β-(α-hydroxy-β-iodo)-propanoyl group.

5. A process as in claim 1 wherein the solvent is ethyl acetate.

6. A process as in claim 1 wherein the 17β-(α-hydroxy-β-halo)-propanoyl compound is generated in situ and the pyruvoyl compound is prepared by maintaining a compound having the formula:

wherein R is a cyclopentanophenanthrene nucleus having adrenocortical activity when substituted at the 17β-position with an α-hydroxy acetyl group and the 2,3-epoxidopropionyl group is located at the 17β-position replacing the α-hydroxy acetyl group in a lower polar aliphatic oxygenated solvent containing up to eight carbon atoms at a temperature of from about 50° C. to about 165° C. for a period of from about one to about four hours in the presence of a reagent selected from the group consisting of hydrogen chloride, hydrogen bromide and hydrogen iodide.

No references cited.